US009594644B2

(12) United States Patent
Abouzour et al.

(10) Patent No.: US 9,594,644 B2
(45) Date of Patent: Mar. 14, 2017

(54) CONVERTING A SERIAL TRANSACTION SCHEDULE TO A PARALLEL TRANSACTION SCHEDULE

(71) Applicants: Mohammed Abouzour, Ontario (CA); John Smirnios, Ontario (CA); Daniil Golod, Ontario (CA); Peter Bumbulis, Ontario (CA); Anil Kumar Goel, Waterloo (CA); Ivan Thomas Bowman, Hammonds Plains (CA); Daniel James Farrar, Kitchener (CA)

(72) Inventors: Mohammed Abouzour, Ontario (CA); John Smirnios, Ontario (CA); Daniil Golod, Ontario (CA); Peter Bumbulis, Ontario (CA); Anil Kumar Goel, Waterloo (CA); Ivan Thomas Bowman, Hammonds Plains (CA); Daniel James Farrar, Kitchener (CA)

(73) Assignee: SYBASE, INC., Dublin, CA (US)

( * ) Notice: Subject to any disclaimer, the term of this patent is extended or adjusted under 35 U.S.C. 154(b) by 285 days.

(21) Appl. No.: 14/491,269

(22) Filed: Sep. 19, 2014

(65) Prior Publication Data
US 2016/0085639 A1    Mar. 24, 2016

(51) Int. Cl.
*G06F 17/30* (2006.01)
*G06F 11/14* (2006.01)
(Continued)

(52) U.S. Cl.
CPC ........ *G06F 11/1471* (2013.01); *G06F 9/5038* (2013.01); *G06F 11/1474* (2013.01);
(Continued)

(58) Field of Classification Search
CPC combination set(s) only.
See application file for complete search history.

(56) References Cited

U.S. PATENT DOCUMENTS

2009/0276430 A1* 11/2009 Bruso ............... G06F 17/30362
2013/0117236 A1    5/2013 Schreter
(Continued)

OTHER PUBLICATIONS

"Database Recovery", Oracle8i Concepts. Release 8.1.5. A67781-01, [Online]. Retrieved from the Internet: <URL: http://www.csee.umbc.edu/portal/help/oracle8/server.815/a67781/c28recov.htm, (Jan. 1, 1999), 1-26.
(Continued)

*Primary Examiner* — Shyue Jiunn Hwa
(74) *Attorney, Agent, or Firm* — Schwegman Lundberg & Woessner, P.A.

(57) ABSTRACT

A method and system for transforming a serial schedule of transactions into a parallel schedule of transaction is disclosed. In one example, a computer system stores a list of data transactions in a transaction log. The computer system then reads a respective data transaction from the transaction log. The computer system determines whether the respective data transaction is dependent on any other currently pending data transaction. In accordance with a determination that the respective data transaction is not dependent on any other currently pending data transaction, the computer system applies the data changes to a reconstructed data set. In accordance with a determination that the respective data transaction is dependent on a currently pending second data transaction, the computer system delays commitment of the respective data transaction until the second data transaction has been applied to the reconstructed data set.

13 Claims, 9 Drawing Sheets

(51) Int. Cl.
   *G06F 9/50*   (2006.01)
   *G06Q 20/38*  (2012.01)
(52) U.S. Cl.
   CPC ..... *G06F 17/30348* (2013.01); *G06Q 20/389* (2013.01); *G06F 2201/80* (2013.01)

(56) References Cited

U.S. PATENT DOCUMENTS

2014/0059563 A1   2/2014  Edelstein et al.
2014/0330767 A1*  11/2014 Fowler .................. G06F 9/466
                                                      707/607

OTHER PUBLICATIONS

"European Application Serial No. 14004184.9, Extended European Search Report mailed Mar. 26, 2015", 8 pgs.

* cited by examiner ns to personalized services online. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered. Instead, messages can be sent over networked systems almost instantly. Online social networking sites allow members to build and maintain personal and business relationships in a much more comprehensive and manageable manner.

CONVERTING A SERIAL TRANSACTION SCHEDULE TO A PARALLEL TRANSACTION SCHEDULE

TECHNICAL FIELD

The disclosed example embodiments relate generally to the field of network data storage and, in particular, to the field of data restoration.

BACKGROUND

The rise of the computer age has resulted in increased access to personalized services online. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered. Instead, messages can be sent over networked systems almost instantly. Online social networking sites allow members to build and maintain personal and business relationships in a much more comprehensive and manageable manner.

As more and more services are provided online, large amounts of data are generated consistently. Much of this data needs to be saved for later use. For example, messages, search histories, browsing histories, and statistical analyses of data need to be saved to be useful in the future. With so much data needing to be saved, storage systems need to be able to accommodate a large amount of data reliably. However, such systems are generally unable to guarantee that all of the storage components will operate completely without errors or failures. As such, large storage systems often operate over a network to store multiple copies of important data at multiple locations. This improves the reliability and usefulness of a storage system. This data is then ideally transferred to backup locations without data loss or corruption.

Large data stores also facilitate data recovery in case of a crash by storing a transaction log for a given database. Thus, each time the database is changed, the change is recorded in a transaction log. This allows all the changes to be stored in a relatively compact form. Then, if the database crashes, the transaction log can be used to rebuild a correct and current version of the database. This is accomplished by reapplying all the changes in the correct order to the original data set. However, because of the need for strict ordering to ensure accurate representation, the change log is stored in a serial format. Using a serial list of changes to restore data that was originally entered concurrently can take much longer than would be desirable.

DESCRIPTION OF THE DRAWINGS

Some example embodiments are illustrated by way of example and not limitation in the Figures of the accompanying drawings, in which.

Like reference numerals refer to the same or similar parts throughout the drawings.

DETAILED DESCRIPTION

Figure 1:
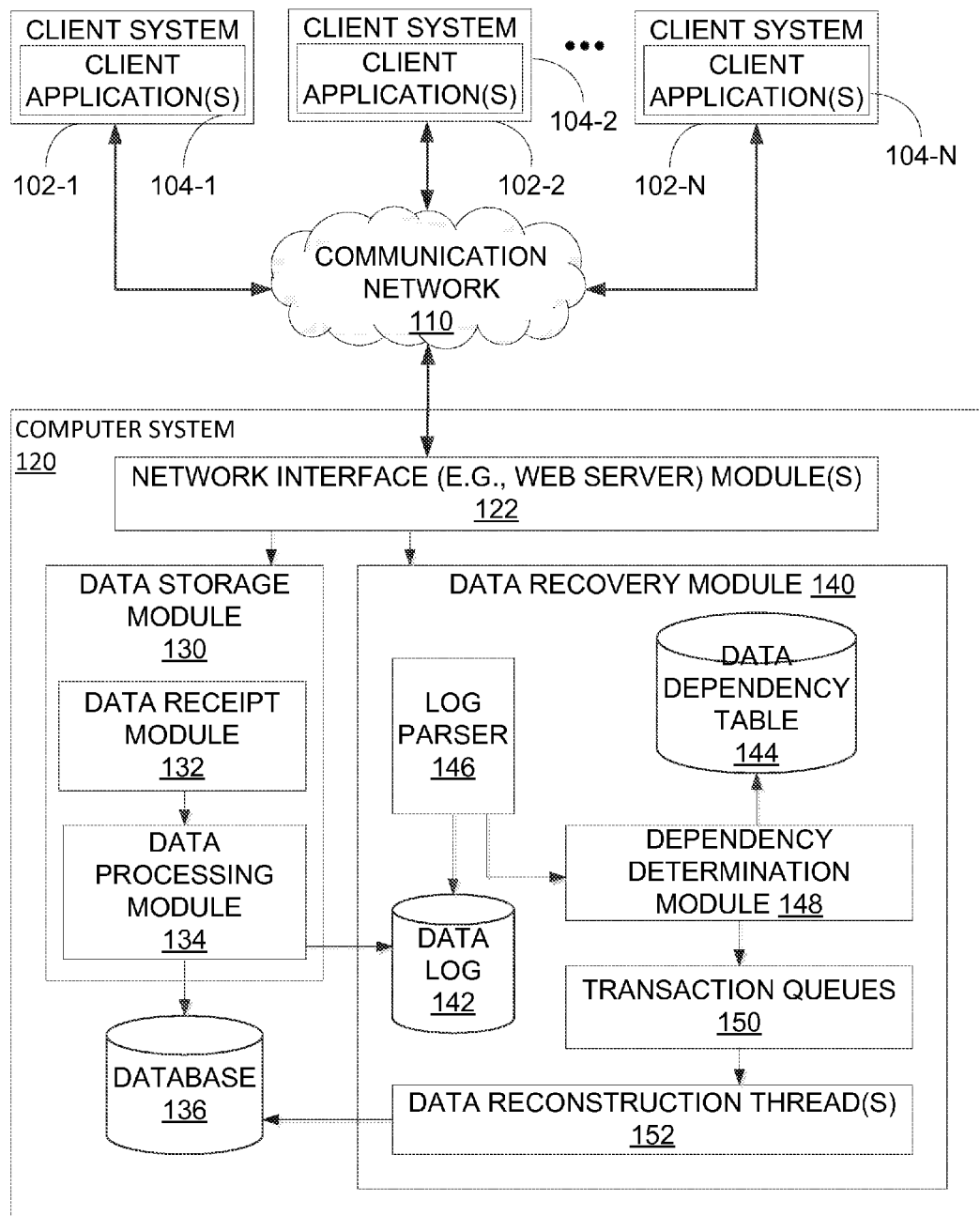
FIG. 1 is a network diagram depicting a computer system, in accordance with an example embodiment, that includes various functional components of a data storage system.

The present disclosure describes methods, systems, and computer readable storage mediums storing computer program products for converting a serial data log into multiple concurrent queues for data restoration within a networked data storage system. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations permutations and combinations of the various features and elements described herein.

To guarantee perfect recreation of the original data set, the change log (also called a data transaction log) is stored serially (e.g., in a simple list with each data transaction being stored sequentially) so that the change log can guarantee that all changes will occur in a correct order. However, because the data changes were originally received and executed concurrently, restoring the data from a data log can potentially take much longer than the time needed to originally store the data changes. For example, if a computer system stores 10 data transactions in parallel per second for 60 seconds, then a total of 600 data changes are stored in that 60 seconds. However, storing 600 data changes one at a time (wherein each data change takes one second to store) takes 10 minutes. This represents a tenfold increase in time. This additional delay can have a negative effect on the usefulness of the entire computer system.

To speed up the data restoration process, the computer system first converts the serially ordered data change log into a parallel restoration schedule. Once the transactions have been converted to a parallel restoration schedule, the transactions can be executed at a significantly increased speed. For example, if the serial list of transactions can be converted into 10 parallel lists, the rate of restoration can be increased up to tenfold.

To accomplish this, the computer system reads data transaction records out of a transaction log file. Each data transaction record is sorted into one of a plurality of concurrent transaction queues. For a respective transaction record the computer system determines whether that record relies or depends on any other transaction that has been read off the transaction log but has not been executed into the data set yet (e.g., transaction A is reliant on transaction B when transaction A modifies the same data that transaction B modifies).

The computer system determines whether a particular data transaction is dependent on any other currently pending transaction. This is accomplished by determining what data is targeted by a given data transaction. The computer system can then check an entry corresponding to the data target in a data dependence table. Once the dependencies for transactions are determined, the data transactions are loaded into one or more concurrent transaction queues.

One or more threads then execute transactions stored in the transaction queues. Each thread accesses a concurrent transaction queue to read out (e.g., pop off the queue) a single data transaction record. The thread then determines whether the single data transaction record currently relies on a second transaction (e.g., there is another transaction that has to be executed before this transaction can be executed).

In accordance with a determination that the data transaction record does not currently rely on a second data transaction, the thread (or process) executes the data transaction record and applies the data changes detailed in the data transaction record to the reconstructed data set. In accordance with a determination that the data transaction record does currently rely on a second data transaction, the thread pauses (or sleeps) and waits until it receives confirmation that the second data transaction has been executed (and thus is no longer a pending data transaction).

FIG. 1 is a block diagram depicting data storage computer system 120 that includes various functional components of a computer system 120, in accordance with some example embodiments. The computer system 120 includes a network interface 122, a data storage module 130, and a data recovery module 140. The computer system also is connected to one or more client systems 102-1 to 102-N. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some example embodiments, a client system (e.g., one of 102-1 to 102-N) is an electronic device, such as a personal computer, a laptop, a smartphone, a tablet, a mobile phone or any other electronic device capable of communication over the communication network 110. Some client systems 102 include one or more client applications 104-1 to 104-N, which are executed by the client system 102-1. In some example embodiments, the client application(s) 104-1 to 104-N includes one or more applications from the set consisting of search applications, communication applications, productivity applications, storage applications, word processing applications, or any other useful applications. The client system 102-1 uses the client applications 104 to communicate with the computer system 120 and transmit data for storage to, and receive data from, the computer system 120.

In some example embodiments there are a plurality of client systems (102-1 to 102-N) that all connect and interact with the computer system 120. Each of these transactions can occur simultaneously, depending on the bandwidth and processing power available to the computer system 120 and the various client systems 102-1 to 102-N.

In some example embodiments, as shown by way of example in FIG. 1, the computer system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a computer system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three component type of architecture, the various example embodiments are by no means limited to this architecture.

As shown by way of example in FIG. 1, the computer system 120 includes a network interface module (e.g., a web server) 122, which receives data from various client systems 102, and communicates data back to the appropriate client systems 102 when appropriate. For example, the network interface module(s) 122 receives a data storage request from a client system 102 and transmits the data storage request to the data storage module 130. The data storage module 130 then stores the data in the database 136. The network interface 122 responds by sending a data receipt acknowledgement message to the client system 102.

As shown by way of example in FIG. 1, the data components include a database 136 for storing data, a data log 142 for logging data changes to the database 136, and a data dependency table 144. The application logic components include, in the data storage module 130, a data receipt module 132 and a data processing module 134. The data recovery module 140 includes a log parser 146, dependency determination module 148, one or more transaction queues 150, and one or more concurrent data reconstruction threads 152.

The data receipt module 132 receives data storage requests from client systems 102 through the network interface 122. The data receipt module 132 then passes the data to be stored to the data processing module 134. The data processing module 134 then analyzes the data storage request to produce specific data changes. The data changes are then transmitted to the database 136 for storage. The data changes are also transmitted to the data log 142 for logging. Logging the data changes (e.g., data transactions) enables the computer system 120 to recover from a failure of the computer system's storage capabilities.

The data recovery module 140 restores the data stored in the database 136 after a failure. The data is restored based on data stored in the data log 142. The data recovery module 140 begins restoration of data based on either an internal determination from the computer system 120 (e.g., the computer system itself detects a failure in memory) or from an external system through the network interface 122. The data recovery module 140 then begins restoring the lost or damaged data.

In some example embodiments, the log parser 146 reads data out of the data log sequentially. The data log 142 includes a serial list of data transaction records. Each data transaction record includes data regarding a particular update to the database 136. The log parser 146 reads out a single data transaction record at a time. Once the data transaction record is parsed out of the data log 142, the log parser 146 passes it to the dependency determination module 148.

The dependency determination module 148 receives a plurality of data transaction records from the log parser 146. Each data transaction record includes, at least, a data change to be made to the data stored in the database 136 and a description of what data is to be updated (e.g., an address in memory to be modified). For example, data transaction record A includes at least the data change (adding 5) and a data address (row 6) that will be altered.

The dependency determination module 148 then accesses the data dependency table 144 to determine whether the current data transaction record is dependent on any other transactions. If so, the current data transaction record waits until that transaction is completed before beginning execution itself. The data dependency table 144 stores a plurality of data entries. In some example embodiments, the data dependency table 144 stores one entry in the table for each data unit in the data set. For example, the data dependency table 144 stores a table entry for each row or a table entry for each cell.

The dependency determination module 148 then uses the data address (e.g., the data that is to be changed, either by location or some other identifier) and looks up that address in the data dependency table 144. Each entry in the data dependency table 144 can hold either a pointer to a currently pending data transaction (a data transaction is currently pending only if it has been read off the data log 142 but not yet executed to the main data set) or be blank.

If the data dependency table 144 entry associated with the data target address in the current data transaction record has a pointer, the dependency determination module 148 determines that the current data transaction record is dependent on the data transaction that is referenced by the stored pointer. For example, if transaction A has a target data address of row 30 and the data dependency table 144 entry for row 30 stored a pointer for transaction C, the dependency determination module 148 determines that the current data transaction record (e.g., transaction A) depends on transaction C.

In accordance with a determination that the current data transaction record depends on a currently pending transaction, the dependency determination module 148 updates the current data transaction record to include a pointer to the transaction it depends on. For example, the transaction record for data transaction A is updated to include a pointer to the transaction record for data transaction C when it is determined that transaction A depends on transaction C.

The dependency determination module 148 also updates the data entry in the data dependency table 144 to be a pointer to the current data transaction record. The data dependency table 144 entries reflect only the most recent data transaction to edit the data they reference. So, continuing the above example, the dependency determination module 148 would update the data entry for row 30 to be a pointer to transaction A. Because transaction A is dependent on transaction C, any future transactions that will modify the data in row 30 will be dependent on transaction A. Being dependent on transaction A will ensure that any new transaction will not execute before transaction C. Thus the data dependency table 144 stores a single most recent transaction while still maintaining strict dependency order.

In accordance with a determination that the data dependency table 144 entry associated with the data target address in the current data transaction record does not have a pointer, the dependency determination module 148 just updates the entry to include a pointer to the current data transaction record.

Once the dependency determination module 148 has updated the dependency of the current data transaction, the current data transaction record is moved to one of several concurrent transaction queues 150. Each concurrent transaction queue is a concurrent independent queue for allowing the execution of data transactions to be operated in parallel, rather than in series. This greatly increases the speed of the restoration operation.

In some example embodiments, the current data transaction record is sorted into a transaction queue of the plurality of transaction queues 150 based on the connection from which the data transaction originated. In other embodiments, the current data transaction record is sorted to one of the transaction queues 150 based on other factors such as the data it modifies, the load balancing of other queues, and so forth.

Data reconstruction threads 152 are threads (or processes) that read data transaction records off the plurality of transaction queues 150 and execute them to recreate the lost data. In some example embodiments, each thread 152 is associated with a single transaction queue 150. In other embodiments, there are more transaction queues 150 than threads 152 and each thread 152 switches between transaction queues 150 as necessary.

A data reconstruction thread 152 retrieves a current data transaction record from one of the plurality of transaction queues 150. Data reconstruction thread 152 determines if the current data transaction record is dependent on another currently pending transaction. If so, the data reconstruction thread 152 waits to execute the current data transaction record until the transaction that it depends upon is executed. The data reconstruction thread 152 either goes to "sleep" (e.g., is temporarily suspended) or continues processing another transaction queue.

When the data reconstruction thread 152 executes a data transaction record, the thread checks to see if the record lists another transaction that depends on it. For example, transaction A includes a pointer for transaction X, which relies on transaction A. If so, the thread 152 follows that pointer to the depending data transaction record and removes dependency data (e.g., a pointer back to the current data transaction record) from that data transaction record. Thus, the previously dependent data transaction record is no longer dependent on another transaction and may be executed right away.

For example, transaction A includes a pointer for transaction X, which relies on transaction A. Similarly, transaction record X includes a pointer to transaction A, identifying transaction A as the data transaction record that it depends on. Once A has been executed, the thread removes the pointer from transaction X, such that transaction X is no longer dependent on another data transaction. In some example embodiments, the thread also removes the pointer for the current data transaction record from the data dependency table 144.

Once all the data log 142 data has been executed, the entire data set has been rebuilt and may be restored in database 136 or another, similar database if database 136 is no longer operational.

Figure 2:
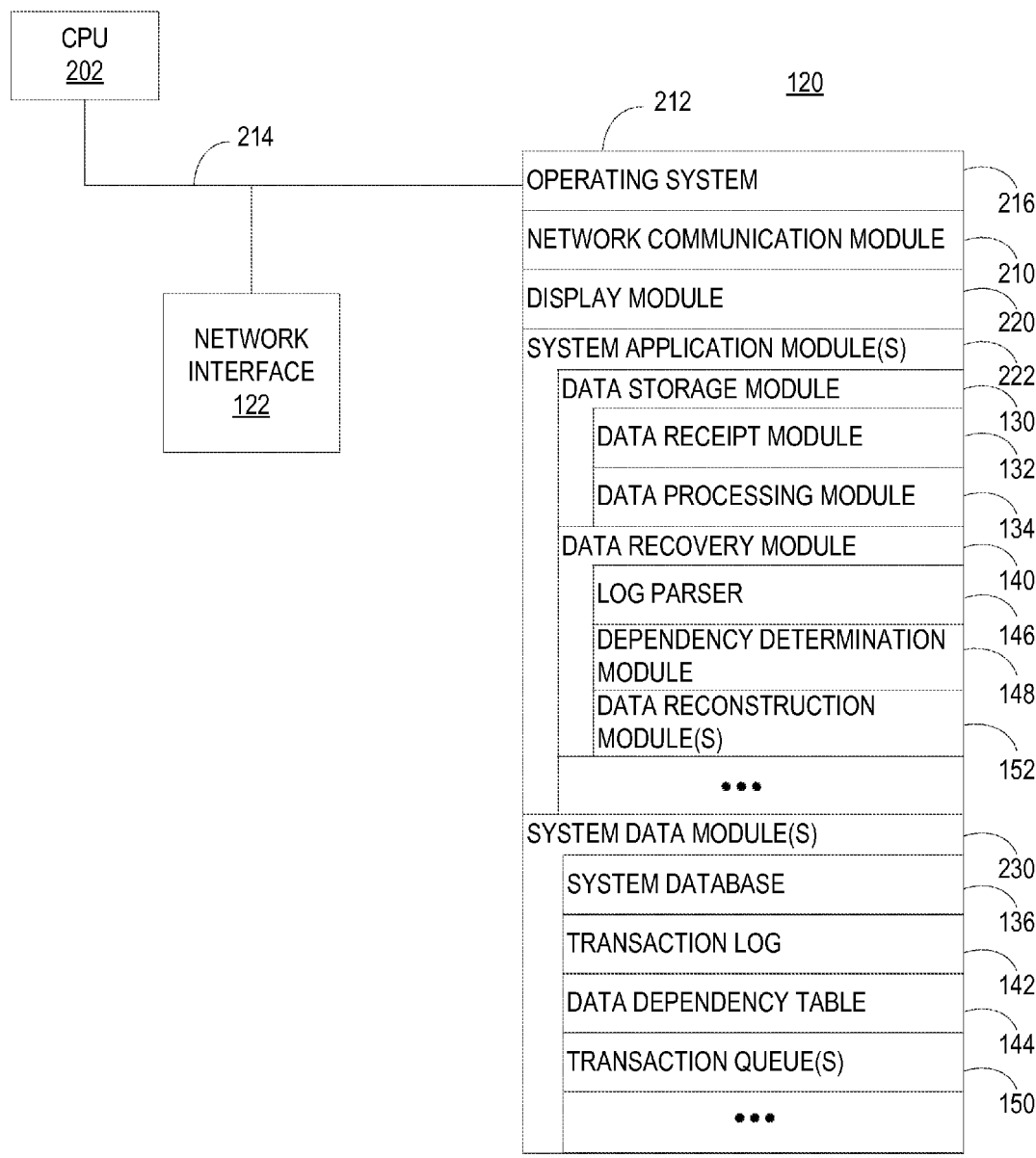
FIG. 2 is a block diagram illustrating a computer system, in accordance with some example embodiments.

FIG. 2 is a block diagram illustrating a computer system 120, in accordance with some example embodiments. The computer system 120 typically includes one or more processing units (CPUs) 202, one or more network interfaces 122, memory 212, and one or more communication buses 214 for interconnecting these components.

Memory 212 includes high-speed random access memory, such as Dynamic Random Access Memory (DRAM), Static Random Access Memory (SRAM), Double Data Rate Random Access Memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some example embodiments, memory 212 or the computer readable storage medium of memory 212 stores the following programs, modules, and data structures, or a subset thereof:

- an operating system 216 that includes procedures for handling various basic system services and for performing hardware dependent tasks;
- a network communication module 210 that is used for connecting the computer system 120 to other computers via the one or more communication network interfaces 122 (wired or wireless) and one or more communication networks, such as the Internet, other WANs, LANs, metropolitan area networks, etc.;
- a display module 220 for enabling the information generated by the operating system 216 to be presented visually as needed;
- one or more system application modules 222 for handling various aspects of storing and recovering data, including but not limited to:
    - a data storage module 130 for receiving and storing data from one or more client systems (e.g., systems 102-1 to 102-N in FIG. 1) wherein the module further includes, but is not limited to:
        - a data receipt module 132 for receiving data over a communication network and determining whether it should be stored; and
        - a data processing module 134 for applying received data changes to the system database 136;
    - a data recovery module storage module 140 for recovering data that has been lost or corrupted data when the computer system 120 has a failure, including, but not limited to:
        - a log parser 146 for reading data transaction records out of the data log 142 one record at a time, in sequential order;
        - a dependency determination module 148 for, given a particular data transaction record, determining whether it depends on another, currently pending, data transaction (e.g., another data transaction that affects the same memory section and therefore needs to be completed before the particular data transaction is executed); and
        - a data reconstruction module 152 for running a plurality of independent, concurrent threads or processes that each pull a current data transaction record off one of the transaction queues 150, determines whether it depends on another currently pending data transaction record and if not, executing the data transaction; and
- a system data module 230 for storing data at the computer system 120, including but not limited to:
    - a system database 136 for storing large amounts of data either produced by the computer system 120 or received from one or more client systems (e.g., system 102 from FIG. 1);
    - a transaction log 142 for storing a record of each transaction (e.g., data change) made to the data stored in the system database 136 so that the data set can be completely recovered in the event of a system failure or corruption;
    - a data dependency table 144 for a plurality of entries in a table that each represent a specific portion of data in the system database 136 and each entry in the plurality of entries stores data identifying (e.g., a pointer) the most recent and currently pending data transaction record to alter the specific portion of the data that is associated with the particular entry; and
    - one or more transaction queues 150 for preparing one or more data transaction records to be executed in a parallel schedule by one or more threads from the data reconstruction module 152 and wherein each queue is operated in "first in, first out" (FIFO) style.

Figure 3A:
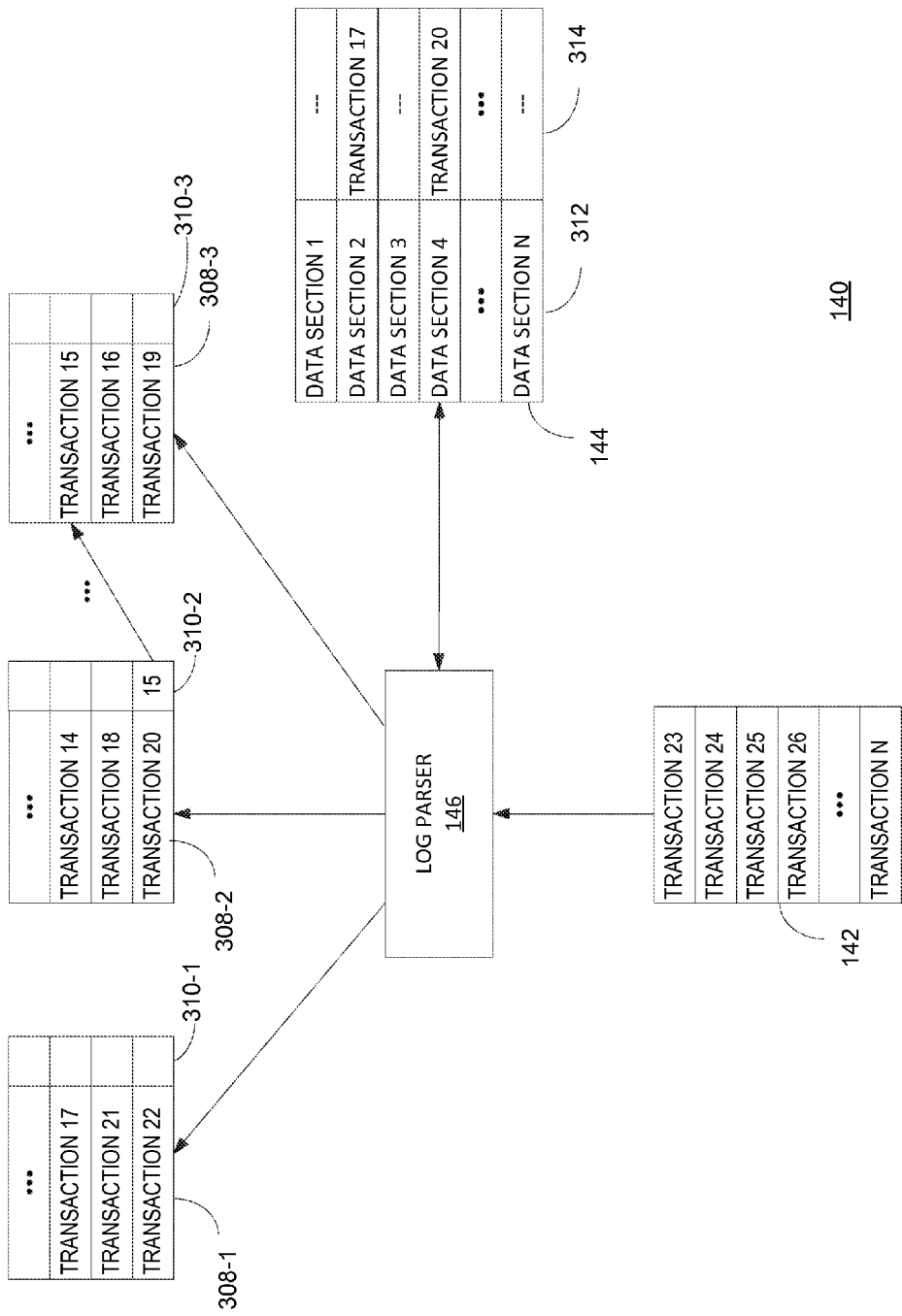
FIGS. 3A and 3B are block diagrams illustrating a computer system, in accordance with some example embodiments.

FIG. 3A depicts a block diagram of at least some components of a data recovery module 140, in accordance with some example embodiments. In accordance with some example embodiments, the data recovery module 140 includes a data log 142. The data log 142 includes one or more data transaction records (e.g., transaction 23 to transaction N). Each data transaction record stores a single change to the data stored on a computer system (e.g., the system 120 in FIG. 1) and a target data address for the change, wherein the target data address value is an identifier of the data that will be changed (e.g., database row). For example, transaction 23 includes the data change (e.g., set the value equal to "Tomorrow") and a target data address of row 25.

The log parser 146 reads a current data transaction record off the transaction data log 142. The log parser 146 always reads the next sequential data transaction off the transaction data log 142 so as to ensure that data integrity is preserved, wherein the sequence is the order the data transactions were added to the data log 142. In some example embodiments, the log parser 146 then determines whether the current data transaction record is dependent on a currently pending data transaction.

The log parser 146 determines the data target address in the current data transaction record. The log parser 146 then accesses the data dependency table 144. Using the data target address for the current data transaction record, the log parser 146 accesses a specific data entry (312) in the data dependency table 144 that is associated with the data target address for the current data transaction record. For example, the log parser 146 reads data transaction record 23 from the data log 142. Transaction record 23 includes a target address of data section 2. The log parser 146 then accesses the data entry for data section 2 in the data dependency table 144.

Once the log parser 146 has accessed the correct data entry in the data dependency table 144, the log parser 146 then determines whether there is an identifier for a currently pending data transaction (e.g., a pointer) in the identifier field 314. If so, the log parser 146 determines that the current data transaction record is dependent on the currently pending data transaction identified in the identifier field 314. Continuing the above example, the log parser 146 determines that data transaction 23 is dependent on transaction 17 because a pointer (or other identifier) to transaction 17 is stored in the identifier field 314 associated with data section 2 in the data dependency table 144.

The data restoration module 142 also includes a plurality of concurrent transaction queues 308-1 to 308-3. Each queue 308 temporarily stores one or more data transaction records as it waits to be executed and thus be applied to reconstructed data set. Each transaction record also includes a dependency pointer field 310-1 to 310-3 that, if applicable, includes an identifier for another data transaction upon which the current data transaction record depends. Although multiple dependency pointer fields are displayed, when referring to a dependency point field generally the specification will use 310. However, when a specific data dependency field is referenced, its specific reference will be used (e.g., 310-1). A transaction record with a value in the dependency pointer field 310 cannot be executed until the referenced data transaction is executed and the field is cleared.

Figure 3B:
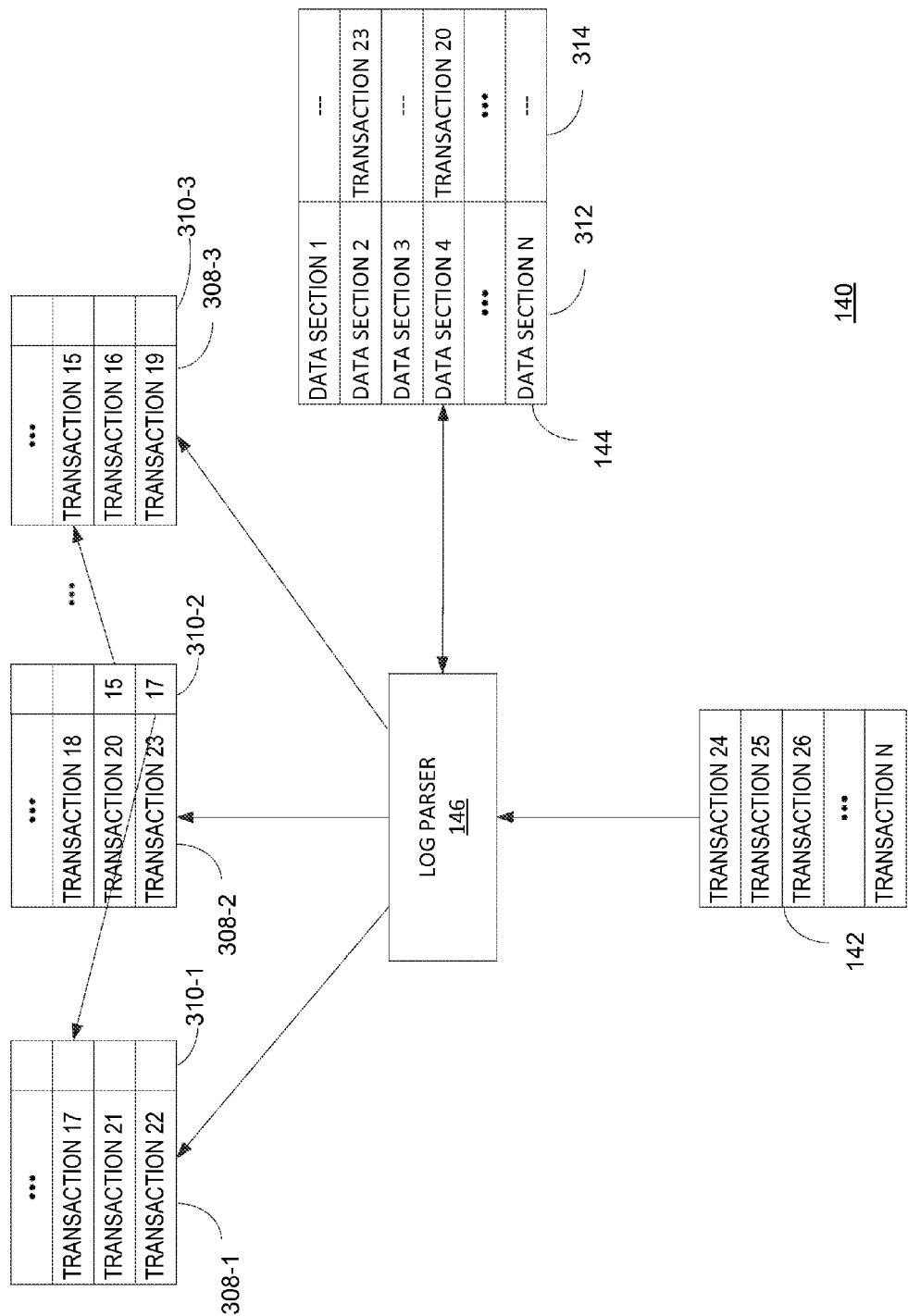

FIG. 3B depicts a block diagram of at least some components of a data recovery module 140, in accordance with some example embodiments. Continuing with the example shown in FIG. 3A, a current data transaction record (e.g., transaction 23) is read off the data log 142 and analyzed by the log parser 146. The log parser 146 determines whether the current data transaction record is dependent on a currently pending data transaction. If so, the dependency pointer field 310 of the current data transaction record is updated with an identifier (e.g., a pointer) of the data transaction record upon which the current data transaction record depends.

The log parser 146 also updates the data dependency table 144 to include an identifier of the current data transaction record in the data entry 312 that the current data transaction record is going to alter. In some example embodiments, the log parser 146 also removes the identifier information for the previously listed data transaction. In this way the data dependency table 144 now accurately points to the most recent data transaction record to change particular data in the dataset.

In some example embodiments, the log parser 146 then pushes the current data transaction record onto one of the plurality of concurrent transaction queues 308-1 to 308-3. The log parser 146 determines the specific concurrent transaction queue 308 based on one or more factors including, but not limited to, the connection that the transaction was originally associated with, the size of each queue, and the dependence data of the transaction.

In the current example, transaction 23 was read out of the data log 142 by the log parser 146. The log parser 146 determined that transaction 23 alters data section 2. The log parser 146 then accesses the data dependency table 144 to determine whether data section 2 currently lists a data transaction identifier. In this case, the data dependency table 144 entry for data section 2 lists transaction 17, which is currently queued in one of the concurrent transaction queues 308-1.

The log parser 146 updates the data entry for data section 2 to add an identifier 314 for transaction 23 to the data dependency table 144. Additionally transaction 23 is added to one of the concurrent transaction queues 308-2. In addition, the dependency pointer field 310-2 associated with data transaction 23 now points to transaction 17. Thus, transaction 23 cannot be executed until transaction 17 is executed. In this way, the correct ordering of data transactions is maintained as the single list of transactions is split into multiple concurrent queues.

Figure 4A:
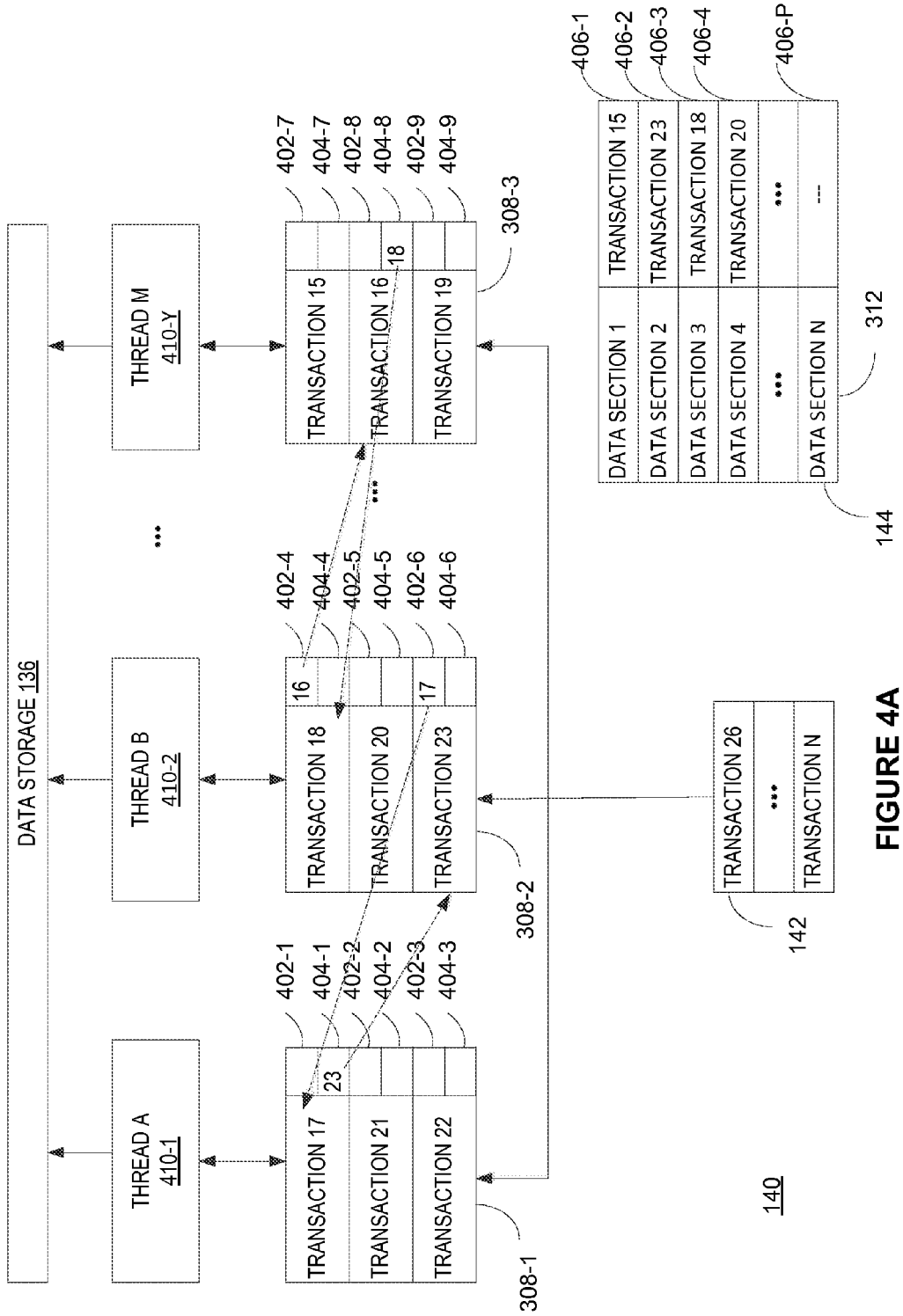
FIGS. 4A and 4B are block diagrams illustrating a computer system, in accordance with some example embodiments.

FIG. 4A depicts a block diagram of at least some components of a data recovery module 140, in accordance with some example embodiments. The data recovery module 140 includes a data log 142 and a data dependency table 144. Data transaction records are read off the data log 142 and placed in one of the plurality of concurrent transaction queues 308-1 to 308-3. The data dependency table 144 stores information on the last pending data transaction that altered particular portions of the data set. If the most recent data transaction to alter a particular portion of the data set is still pending (i.e., the transaction record is still in one of the concurrent transaction queues 308-1 to 308-3), then the corresponding table entry in the data dependency table 144 includes a transaction identifier value (e.g., a pointer) that identifies the currently pending transaction. For example, data transaction 15 targets row 18 and data transaction 15 has been read off the transaction log but not yet executed. As a result, the data dependency table 144 entry for row 18 will be updated to include a pointer to data transaction 15 until either data transaction 15 is applied to the reconstructed data set or another data transaction that targets row 18 is read off the data log 142.

In the example shown in FIG. 4A, transactions up to transaction 26 have been read off the transaction log and placed in one of the concurrent transaction queues 308. Similarly, at least some of the data section entries in the data dependency table 144 include identifier values for currently pending data transaction records. For example, the entry for data section 1 lists transaction 15 406-1, the entry for data section 2 lists transaction 23 406-2, the entry for data section 3 lists transaction 18 406-3, and the entry for data section 4 lists transaction 20 406-4. The entry for data section N 406-P lists no transaction number or pointer because there are no currently pending transactions that modify data section N.

Each concurrent transaction queue 308-1 to 308-3 stores a list of transaction records. Each respective transaction record includes dependency data 402-1 to 402-9 that lists an identifier (e.g., a pointer) for a transaction record upon which the respective transaction relies. Furthermore, each respective transaction record includes dependent data 404-1 to 404-9 that lists an identifier (e.g., a pointer) for a transaction record that depends on the respective data transaction record. For example, transaction 18 relies on transaction 16 and includes a pointer 402-4 to transaction 16. Transaction 16 also includes a pointer 404-8 to transaction 18 as a transaction that relies on transaction 16.

Each concurrent transaction queue 308-1 to 308-3 interacts with one or more threads 410-1 to 410-Y to execute the data transaction (e.g., apply the changes in the data transaction record to the reconstructed data.) Although FIG. 4 includes a plurality of displayed threads (410-1 to 410-Y), when speaking about threads generally, the specification uses the reference number 410. However, if a specific thread is referenced, the specific reference number will be used. Each thread 410 reads a data transaction record from a concurrent transaction queue 308. The thread 410 then determines whether the data transaction record depends on another currently pending transaction. If so, the thread 410 delays execution of the data transaction until the transaction upon which it depends is executed. If not, the thread 410 then executes the transaction and applies the data changes to the database 136.

Figure 4B:
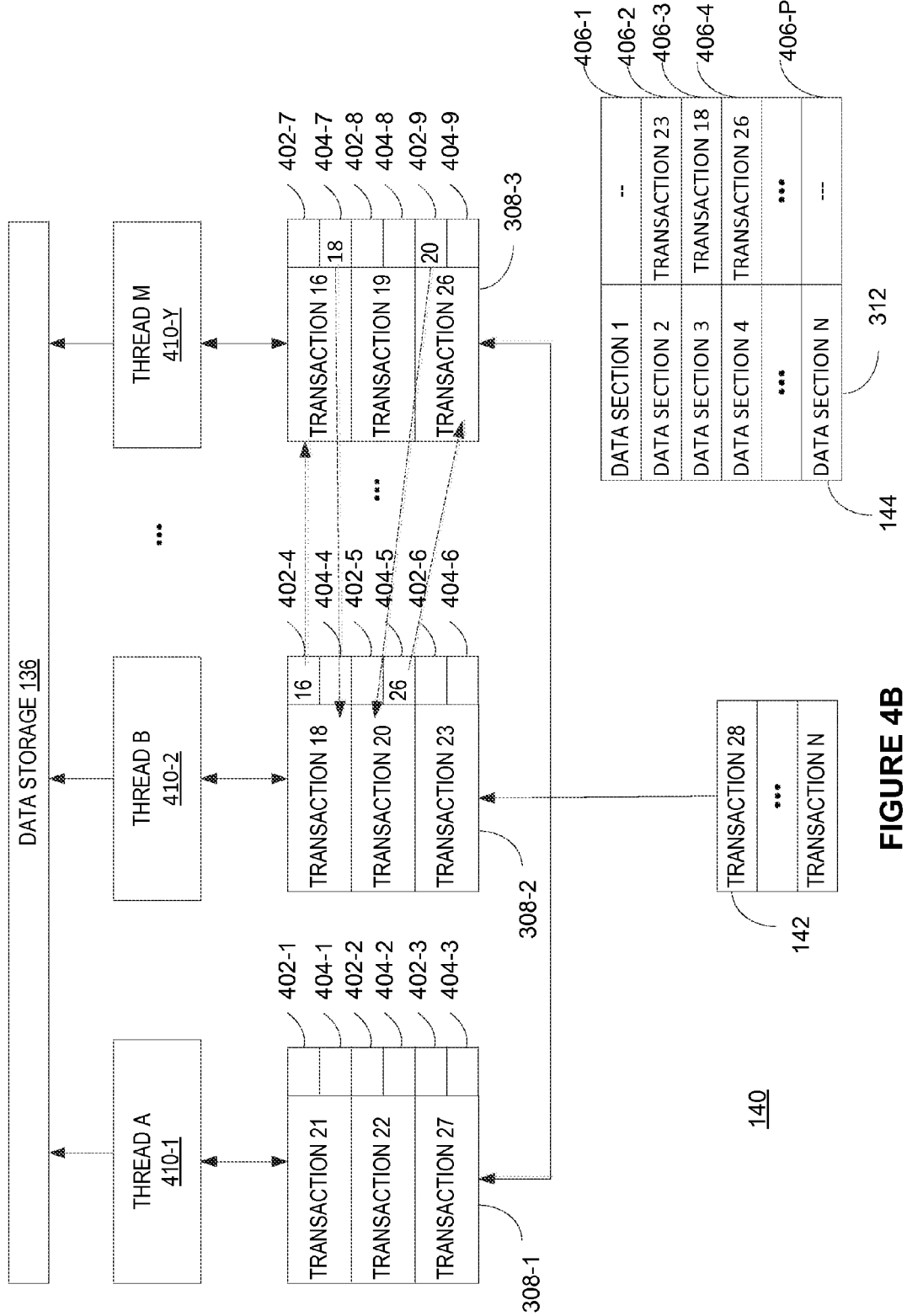

FIG. 4B depicts a block diagram of at least some components of a data recovery module 140 in accordance with some example embodiments. FIG. 4B represents the system of FIG. 4A after a small amount of time has passed.

Transactions 26 and 27 have been read off the transaction log. Transaction 26 modifies data section 4 and thus the data dependency table 144 entry for data section 4 is updated to include an identifier for transaction 26. The previous identifier (for transaction 20) is removed from the data dependency table 144. In addition, the data transaction record 26 is updated to reflect dependency on transaction 20. Thus, the data transaction record 26 includes a pointer 404-9 to transaction 20. Correspondingly, data transaction record 20 has been updated to include a reference to data transaction 26 as a transaction that depends on data transaction record 20.

Data transaction record 26 is added to a concurrent transaction queue 308-3. Data transaction record 27 is also added to a concurrent transaction queue 308-1. The dependency data for data transaction record 26 has been updated to list data transaction record 20. Because both data transaction record 26 and data transaction record 20 alter data section 1, and data transaction record 20 needs to occur first, the dependency data for data transaction record 26 lists data transaction record 20 to ensure that data transaction record 26 is not applied to the database 136 before data transaction record 20.

Similarly, data transaction record 20 has dependent data 404-5 that is updated to list data transaction record 26. In this way, when data transaction record 20 is executed (e.g., applied to database 136), the thread can follow the link in the dependency data 404-5 to update data transaction record 26 by removing the link to data transaction record 20 (because data transaction record 20 is no longer pending and data transaction record 26 is now free to be applied to database 136).

Threads 410-1 to 410-Y then access the concurrent transaction queues 308 to apply the various data transaction records to the database 136 and thus create a reconstructed data set. Since the time pictured in FIG. 4A, two data transaction records have been read off the concurrent transaction queues 308-1 to 308-3 and applied to database 136. Specifically, data transaction record 17 and data transaction record 15 have been removed from their respective queues by a thread 410-1 to 410-Y and applied to the database 136.

For example, thread M 410-Y removes data transaction record 15 from its queue 308-3. The thread M 410-Y first checks if data transaction record 15 currently depends on any current queue. However, the dependency data slot 402-7 for data transaction record 15 (as seen in FIG. 4A) is empty, indicating that data transaction record 15 is not dependent on any currently pending data transaction records and thus may be executed. Thread M 410-Y also determines the data section that data transaction record 15 will change and updates the data dependency table 144 entry associated with that data section 406-1. So, for example, the data dependency table 144 entry for data section 1 406-1 previously included an identifier (e.g., a pointer) for data transaction record 15. Thread M 410-Y removed that identifier as part of the process of executing data transaction record 15. Thus, the data dependency table 144 data entry associated with data section 1 406-1 is now blank. In some example embodiments, instead of a black section, data sections without a current identifier are simply removed from the table. In this way, only the data sections with current identifiers are represented in the data dependency table 144.

Concurrently, thread A 410-1 removes data transaction record 17 from its respective queue 308-1. The thread A 410-1 first checks if data transaction record 17 currently depends on any current queue. However, the dependency data slot 402-1 for data transaction record 17 (as seen in FIG. 4A) is empty, indicating that data transaction record 17 is not dependent on any currently pending data transaction records and thus may be executed. However, the thread A 410-1 also checks the dependent data slot 404-1 of data transaction record 17 and determines that data transaction record 23 depends on data transaction record 17. Thus, as part of executing data transaction record 17, the thread A 410-1 clears the reference to data transaction record 17 from the dependency data slot 402-6 for data transaction record 23.

Thread B 410-2 attempts to execute data transaction record 18, which is the next data transaction record to be executed in its respective queue 308-2. However, the dependency data for data transaction record 18 includes a reference to data transaction record 16, which is still pending. Thus, thread B 410-2 will have to wait until data transaction record 16 has been executed to execute data transaction record 18. In the meantime, thread B 410-2 will either go into a non-active state (e.g., a sleep state) or will work on another queue.

Figure 5A:
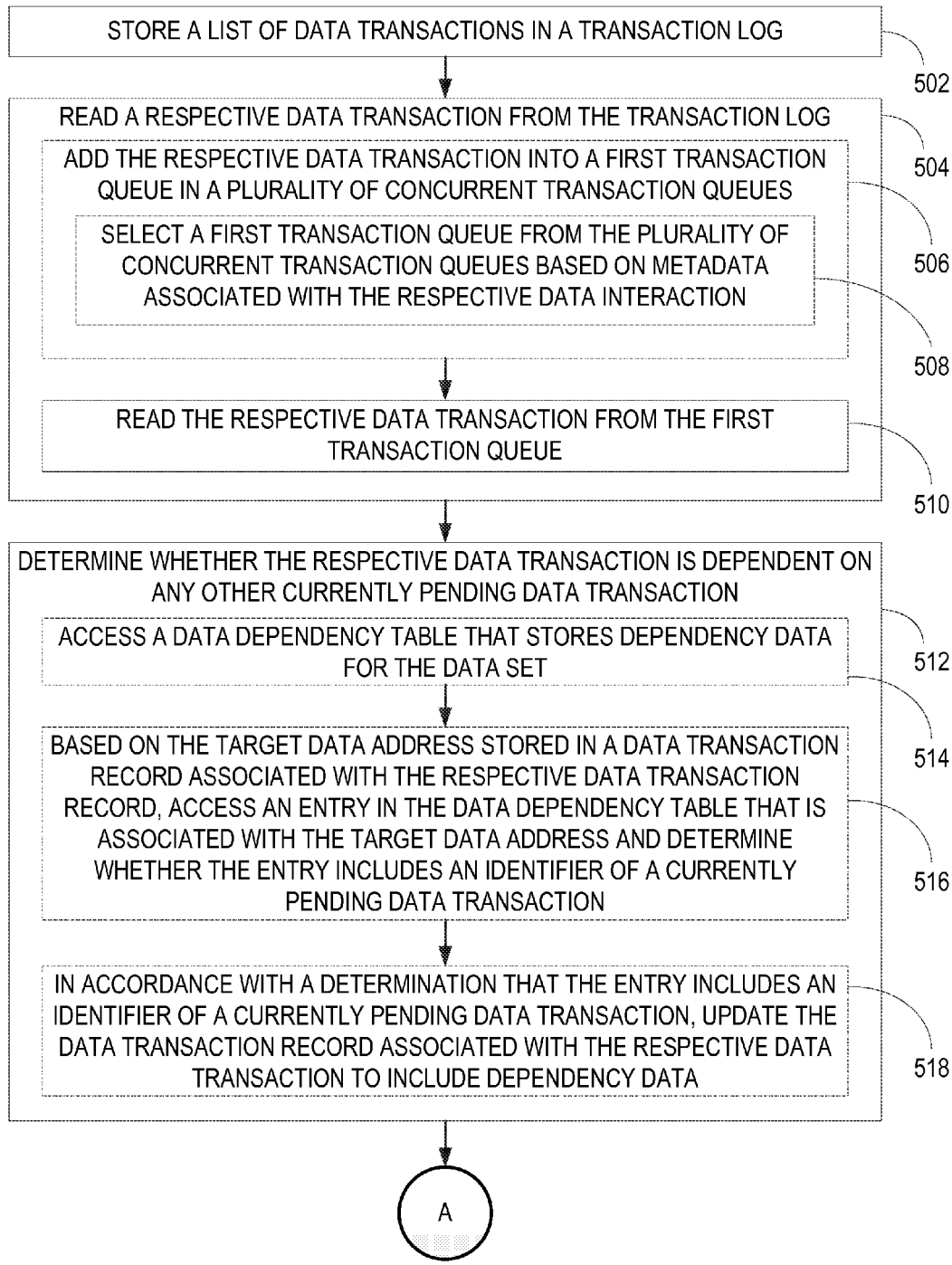
FIGS. 5A and 5B are flow diagrams illustrating a method, in accordance with an example embodiment, for converting a serial transaction schedule to a parallel transaction schedule, in accordance with some example embodiments.

FIG. 5A is a flow diagram illustrating a method for transforming a serial schedule of transactions into a parallel schedule of transactions, in accordance with some implementations. Each of the operations shown in FIG. 5A may correspond to instructions stored in a computer memory or computer-readable storage medium. Optional operations are indicated by dashed lines (e.g., boxes with dashed-line borders). In some implementations, the method described in FIG. 5A is performed by the computer system 120 shown in FIG. 1. However, other systems and configurations can be used to implement the method described in FIG. 5A.

In some implementations, the method is performed at a computer system including one or more processors and memory storing one or more programs for execution by the one or more processors.

The computer system stores (502) a list of data transactions in a transaction log. In some example embodiments, the list of data transactions represents all the changes made to a data set over a period of time. For example, as data transactions are transmitted to a computer system, each data transaction is also logged into a transaction log. These transactions can be used to recreate the whole data set if the computer system experiences a failure.

In some example embodiments, each data transaction record includes at least one data change and a target data address. For example, the current data transaction record notes that the data in Row 15 (target data address) should be set to "All Quiet on the Western Front" (data change).

In some example embodiments the computer system (e.g., system 120 in FIG. 1) reads (504) a respective data transaction from the transaction log. Transaction records are read from the transaction log (e.g., the log is parsed) one data transaction record at a time. Each data transaction record includes the specific data change represented by the data transaction record (e.g., add $15 to account 2034) and metadata, including but not limited to, the source of the transaction (e.g., specific connection identification number or Internet Protocol (IP) address), the time of the transaction, the data affected by the data transaction (e.g., Row 2 of the database), and any other metadata associated with the data transaction.

The computer system (e.g., system 120 in FIG. 1) adds (506) the respective transaction into a first transaction queue in a plurality of concurrent transaction queues. The computer system (e.g., system 120 in FIG. 1) selects (508) a first transaction queue from the plurality of concurrent transaction queues based on metadata associated with the respective data transaction. For example, the computer system (e.g., system 120 in FIG. 1) selects a first queue based on the connection data associated with the transaction record.

In some example embodiments, the transaction records are sorted based on the originating connection associated with each transaction record. In other embodiments, the transaction records are sorted into concurrent transaction queues based on a group of which the transactions are part. In yet other embodiments, the data transaction records are placed in queues based on the current queue load, such that each queue remains approximately the same length. The computer system (e.g., system 120 in FIG. 1) then reads (510) the respective transaction from the first transaction queue.

In some example embodiments, the computer system (e.g., system 120 in FIG. 1) determines (512) whether the respective transaction is dependent on any other currently pending data transaction. A transaction is currently pending if it has been read from the transaction log but not applied to the reconstructed data set.

In some example embodiments, a respective data transaction record is determined to be dependent on a second data transaction record if both the respective data transaction record and the second data transaction record have the same associated target data address and the second data transaction has priority over the respective data transaction record. For example, data transaction A has priority over data transaction B if data transaction A occurs first in time relative to data transaction B.

For example, two data transactions both alter the data stored in User A's brokerage account. The first transaction requires all the cash in the account to be transferred to User C's account and the second transaction requires that 10 shares of Widget Co. stock be sold, with the proceeds being placed in User A's account. The second transaction (e.g., sell 10 shares of Widget Co. stock) is dependent on the first transaction (e.g., transfer all the cash to User C's account) because they both modify the amount of cash in User A's account but the first transaction occurs first chronologically. If the second transaction had occurred first chronologically, the first transaction would depend on the second transaction.

It is especially important to determine whether a first transaction depends on a second transaction if the result of the two transactions will be different if they are executed out of order. Continuing the example above, Users A's account has $50 dollars in cash and $100 dollars in Widget Co. stock. The first transaction instructs the system to transfer all the cash in User A's account (in this case $50) to User C's account. The second transaction then sells all of User A's Widget Co. stock (in this case the stock is worth $100) and places the resulting cash in User A's account. Thus, once both transactions have finished executing in the correct order, User A has $100 dollars in his account.

However, if the order of the transactions was reversed and the second transaction occurred first, the final values of the data are different. When the order is reversed, the second transaction first sells all of User A's Widget Co. stock (in this case the stock is worth $100) and places the resulting cash in User A's account (resulting in $150 of cash in User A's account). Then the first transaction is executed and all the cash in User A's account is transferred to User C's account. As a result there is no cash left in User A's account. Thus, by changing the order that the transactions occur, the final result is different. For at least this reason, it is important that no transaction is ever executed before one on which it depends.

In some example embodiments, determining whether the respective transaction is dependent on any other currently pending data transaction includes accessing (514) a data dependency table that stores dependency data for the data set. For example, the data dependency table 144 stores a series of data entries that each are associated with specific sections of the data set (e.g., a row or cell).

The data dependency table 144 is a table (e.g., a hash table) representing all the data stored on the computer system's data storage. The data dependency table 144 is divided up into discreet data chunks or pieces, each representing one section (e.g., a row in a database) in the total data set. For example, if a data dependency table 144 represents a database with 50 rows, then there are 50 entries in the table, with each one corresponding to a specific row in the database 136.

When a data transaction is read out of the data log 142, the computer system determines the address of the data target. Then the computer system accesses the specific entry in the data dependency table 144 that is associated with that data target. The specific entry in the data dependency table 144 is then updated to include a reference (e.g., a pointer) to the data transaction record being processed. For example, transaction D, which modifies data in row S, is read out of the data log 142. The computer system then updates the entry in the data dependency table 144 that represents data row S to list transaction D as the most recent transaction to modify the associated data.

If no data transaction record is listed in a particular entry of the data dependency table 144, then it follows that none of the currently pending data transactions modify the section of the data set represented by that particular entry in the data dependency table 144. However, data transactions that modify the associated section of the data set may still exist in the as-yet-unread portions of the data log 142. Additionally, some data transactions that modify the associated data may have already been executed and are therefore no longer considered pending. When a data transaction is executed (e.g., its changes are committed to the data set) it is no longer considered pending and references to it in the data dependency table 144 and other data transaction records are removed.

Based on the target data address stored in the respective data transaction record, the computer system (e.g., system 120 in FIG. 1) accesses (516) an entry in the data dependency table 144 that is associated with the target data address and determines whether the entry includes an identifier of a currently pending data transaction. For example, if the respective current data transaction record accesses row 15 of the data set, the computer system (e.g., system 120 in FIG. 1) accesses a data entry in the data dependency table 144 that is associated with row 15.

In accordance with a determination that the entry includes an identifier of a currently pending data transaction, the computer system (e.g., system 120 in FIG. 1) updates (518) the respective data transaction record to include dependency data.

In some example embodiments the computer system analyzes a particular data transaction record to determine the specific data section modified by the particular data transaction. The computer system then looks up the specific data entry in the data dependency table 144. Any transaction record listed in a particular entry in the data dependency table 144 is a transaction record that changes the data represented by the entry. Thus, any subsequent data transactions may not execute until the earlier data transaction is finalized. This allows a serial list of data transactions to be executed in parallel (as much as possible).

In some example embodiments, if the data entry in the data dependency table 144 associated with the data target address of the current data transaction record lists a second data transaction record, the computer system updates the current data transaction record to list the second data transaction record as a record upon which the current data transaction record depends. The data dependency table 144 entry related to the data target address is then updated to list the current data transaction record as the most recent data transaction to modify that data section. In some example embodiments, when the current data transaction record depends on a second data transaction, it will include dependency data that includes a reference (e.g., a pointer) to the second data transaction record it relies on.

For example, the computer system reads data transaction F out of the transaction log. The computer system then determines that transaction F alters row 15 in the data set. The computer system then looks up the entry for row 15 in the data dependency table 144. The data dependency table 144 lists transaction C in the entry associated with row 15 in the data dependency table 144. As a result, the computer system updates data transaction F to indicate that transaction F relies on transaction C (e.g., transaction F includes a pointer to transaction C).

If the data dependency table 144 entry for a specific data section does not list a second data transaction record, it indicates that there is no currently pending transaction that modifies that specific data section. In this case, the data dependency table 144 entry is updated to list the current data transaction record. For example, the computer system reads transaction Y out of the data log 142 and determines it modifies row A of the data set. The computer system then determines that the data dependency table 144 entry for row A does not list any currently pending transaction records. The computer system then updates the entry for row A to list data transaction Y.

In some example embodiments, when the computer system determines that a particular data transaction record depends on a second data transaction, the computer system updates the particular data transaction record to indicate that the particular transaction depends on the second data transaction. For example, if the computer system determines that transaction G depends on transaction M, the record for transaction G is updated to reflect that transaction G depends on transaction M.

In some example embodiments, when the computer system determines that a first transaction relies on a second transaction, the second transaction record is updated to list the transaction that depends on the second transaction. For example, if the computer system determines the transaction G depends on transaction M, the record for transaction M is updated to reflect that transaction G depends on transaction M. Thus the records of the transaction that depends and the transaction that is depended on both reflect the dependency relationship between the two.

Figure 5B:
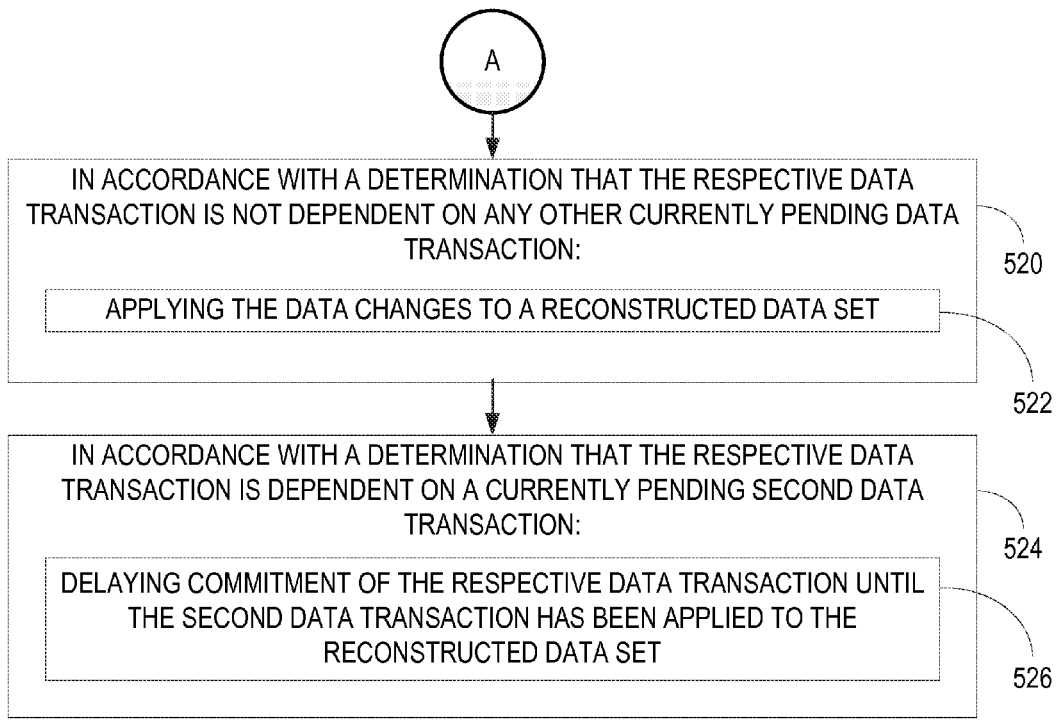

FIG. 5B is a flow diagram illustrating a method for transforming a serial schedule of transactions into a parallel schedule of transactions, in accordance with some implementations. Each of the operations shown in FIG. 5B may correspond to instructions stored in a computer memory or computer readable storage medium. Optional operations are indicated by dashed lines (e.g., boxes with dashed-line borders). In some implementations, the method described in FIG. 5B is performed by the computer system (e.g., system 120 in FIG. 1).

In some implementations the method is performed at a computer system including one or more processors and memory storing one or more programs for execution by the one or more processors.

In some example embodiments, when executing a current data transaction, the thread determines whether the data transaction record lists a transaction record that is dependent on the current data transaction being executed by the data transaction. In some example embodiments, the data transaction record lists a dependent transaction as a pointer to the dependent transaction. For example, as part of the execution process for transaction Q, the thread determines that transaction U relies on transaction Q.

In accordance with a determination that the currently executed transaction does not have a dependent data transaction, the thread then alters the data dependency table 144 to remove the listing of the currently executing transaction in the table entry associated with the data that is modified by the current executed data transaction. For example, data transaction R does not have any dependent data transactions listed in its associated data transaction record. Thus, the thread merely identifies the table entry in the data dependency table 144 that is associated with the data modified by data transaction R and removes the reference (e.g., pointer) to data transaction R. Afterwards, that entry in the data dependence table 144 is empty until another transaction occurs that modifies the data with which it is associated.

In some example embodiments, in accordance with a determination that the respective data transaction is not dependent on any other currently pending data transaction (520), the computer system (e.g., system 120 in FIG. 1) applies (522) the data changes to a reconstructed data set.

In some example embodiments, in accordance with a determination that the respective data transaction is dependent on a currently pending second data transaction (524), the computer system (e.g., system 120 in FIG. 1) delays (526) commitment of the respective data transaction until the second data transaction has been applied to the reconstructed data set.

In accordance with a determination that the currently executed data transaction has a dependent data transaction, the thread then accesses the dependent data transaction and deletes the dependency data (e.g., a pointer) in the dependent data transaction record. For example, a thread is executing transaction Q. Transaction Q stores data indicating that transaction U is dependent on transaction Q. As part of execution of transaction Q, the thread accesses the data transaction record of transaction U and removes the dependency data from the data transaction record associated with transaction U. Thus, transaction U no longer lists a dependency on transaction Q.

In some example embodiments the computer system guarantees that either an executing data transaction will have another transaction that is dependent on it or will be listed in a data entry in the data dependency table 144 (but not both). This is true because each new transaction that is read off the data dependency table 144 is immediately listed in the data dependence table (because it modifies at least some data and is more recent than any other data transaction). The only way for it to be removed from the entry in the data dependency table 144 is if the data transaction is executed or if another transaction is received that modifies the same section. In the second case, the current data transaction record would be updated to list the new data transaction as depending on it. Thus, in this example, if the system determines that transaction R has no dependents, the system then is also able to determine that transaction R is still listed in the appropriate place in the data dependency table 144.

In some example embodiments, when a data transaction is executed, it is no longer a currently pending data transaction and is therefore removed from either the data dependency table 144 (if it has no dependents) or from the data record of its dependent data transaction record (the dependent data record then shows that it has no data transactions on which it depends). Also, in some example embodiments, when the data transaction being executed includes a pointer to a dependent transaction that has been waiting, the thread associated with the data transaction being executed updates the thread associated with the waiting dependent data transaction to notify that thread that the formerly dependent transaction is now ready to be executed and applied to the reconstructed data set. In some example embodiments, this comprises changing a data value associated with a particular concurrent transaction queue indicating that the next transaction is ready to be executed.

In some example embodiments, all the data transactions included in the data log 142 are eventually executed and the lost data set is recovered. The speed with which the data is restored is a function of the number of concurrent transaction queues and associated threads (or processes). The more queues and threads, then the more data transactions can be applied to the data set concurrently.

In some example embodiments the computer system (e.g., system 120 in FIG. 1) determines that one or a series of data transactions need to be executed in a serialized order (e.g., a special data transaction that cannot be converted into a parallel schedule.) For example, a system wide command that affects all memory would need to ensure that it was not put into a parallel schedule. In this case, the computer system (e.g., system 120 in FIG. 1) stops parsing the transaction log and waits for all the currently pending data transactions in the various transaction queues to complete. Once all the currently pending data transactions are complete, the computer system then executes the one or more system wide commands. These are all executed in a serialized schedule (one at a time). Once the system wide commands are complete, the computer system can then return to the method of converting the transaction log into a parallel schedule.

Figure 6:
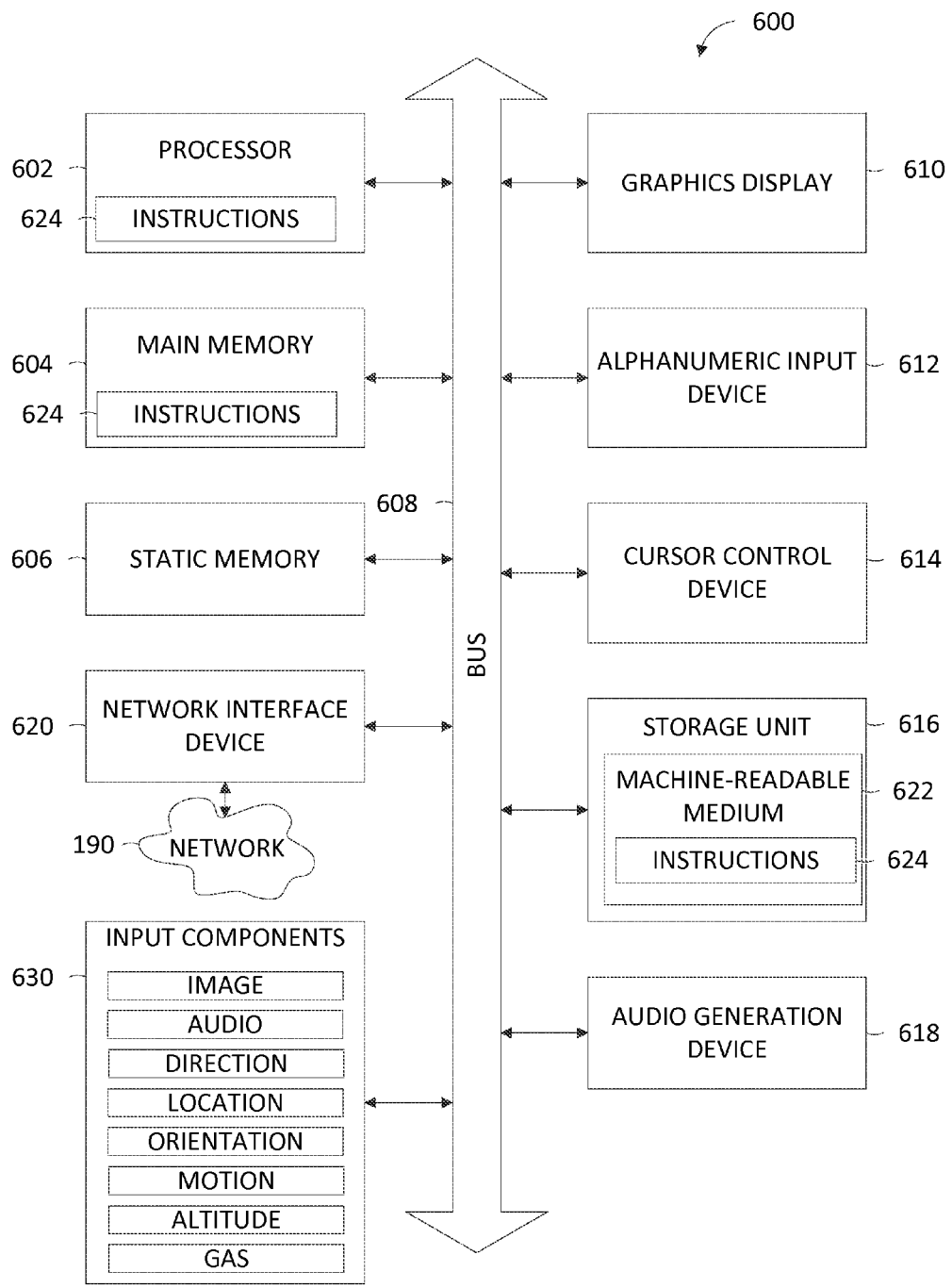
FIG. 6 is a block diagram illustrating components of a machine, according to some example embodiments.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a PC, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a CPU, a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., Hypertext Transfer Protocol (HTTP)).

In some example embodiments, the machine 600 may be a portable computing device, such as a smart phone or tablet computer, and have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    reading each of a plurality of data transaction records from a single transaction log in a sequence in which the plurality of data transaction records were added to the transaction log, each of the plurality of data transaction records indicating a change to be applied to a section of a data set;
    for each respective data transaction record read from the transaction log in the sequence in which the plurality of data transaction records were added to the transaction log:
        selecting, based on metadata associated with the respective data transaction record, a single transaction queue from a plurality of first in, first out (FIFO) transaction queues for the respective data transaction record; and
        adding a pending data transaction for the respective data transaction record into the selected transaction queue; and
    concurrently processing the plurality of FIFO transaction queues, the processing comprising, for each associated transaction queue of the plurality of FIFO transaction queues:
        determining whether a next pending data transaction of the associated transaction queue is dependent on any other pending data transaction in the plurality of FIFO transaction queues based on the section of the data set indicated in the next pending data transaction;
        in accordance with a determination that the next pending data transaction is not dependent on any other pending data transaction in the plurality of FIFO transaction queues:
            applying the next pending data transaction to the data set; and
            removing the next pending data transaction from the associated transaction queue; and
        in accordance with a determination that the next pending data transaction is dependent on another pending data transaction in the plurality of FIFO transaction queues:
            waiting until the other pending data transaction has been applied to the data set; and
            after waiting until the other pending data transaction has been applied:
                applying the next pending data transaction to the data set; and
                removing the next pending data transaction from the associated transaction queue.

2. The method of claim 1, wherein the plurality of data transaction records represent data changes made to the data set over a period of time.

3. The method of claim 1, wherein, in each of the plurality of data transaction records, the section of the data set is indicated by a target data address.

4. The method of claim 1, wherein the next pending data transaction is determined to be dependent on the other pending data transaction when both the next pending data transaction and the other pending data transaction are to be applied to a same section of the data set and the other pending data transaction has priority over the next pending data transaction.

5. The method of claim 1, further comprising, for each respective data transaction record read from the transaction log:
    accessing a data dependency table that stores dependency data for the data set;
    based on the section of the data set indicated in the respective data transaction record, accessing an entry in the data dependency table that is associated with the section of the data set and determining whether the entry includes an identifier of a pending data transaction in the plurality of FIFO transaction queues; and
    in accordance with a determination that the entry includes an identifier of the pending data transaction in the plurality of FIFO transaction queues, updating the pending data transaction for the respective data transaction record to include dependency data.

6. A system comprising:
    one or more processors;
    memory; and
    one or more programs stored in the memory, the one or more programs comprising instructions that, when executed by the one or more processors, cause the system to perform operations comprising:
        reading each of a plurality of data transaction records from a single transaction log in a sequence in which the plurality of data transaction records were added to the transaction log, each of the plurality of data transaction records indicating a change to be applied to a section of a data set;
        for each respective data transaction record read from the transaction log in the sequence in which the plurality of data transaction records were added to the transaction log:

selecting, based on metadata associated with the respective data transaction record, a single transaction queue from a plurality of first in, first out (FIFO) transaction queues for the respective data transaction record; and adding a pending data transaction for the respective data transaction record into the selected transaction queue; and concurrently processing the plurality of FIFO transaction queues, the processing comprising, for each associated transaction queue of the plurality of FIFO transaction queues, determining whether a next pending data transaction of the associated transaction queue is dependent on any other pending data transaction in the plurality of FIFO transaction queues based on the section of the data set indicated in the next pending data transaction;

in accordance with a determination that the respective data transaction is not dependent on any other currently pending data transaction:

applying the next pending data transaction to the data set; and removing the next pending data transaction from the associated transaction queue; and in accordance with a determination that the next pending data transaction is not dependent on any other pending data transaction in the plurality of FIFO transaction queues:

waiting until the other pending data transaction has been applied to the data set; and after waiting until the other pending data transaction has been applied:

applying the next pending data transaction to the data set; and removing the next pending data transaction from the associated transaction queue.

7. The system of claim 6, wherein the plurality of data transaction records represent data changes made to the data set over a period of time.

8. The system of claim 6, wherein, in each of the plurality of data transaction records, the section of the data set is indicated by a target data address.

9. The system of claim 6, wherein the next pending data transaction is determined to be dependent on the other pending data transaction when both the next pending data transaction and the other pending data transaction are to be applied to a same section of the data set and the other pending data transaction has priority over the next pending data transaction.

10. The system of claim 6, the operations further comprising, for each respective data transaction record read from the transaction log:

accessing a data dependency table that stores dependency data for the data set;

based on the section of the data set indicated in the respective data transaction record, accessing an entry in the data dependency table that is associated with the section of the data set and determining whether the entry includes an identifier of a pending data transaction in the plurality of FIFO transaction queues; and in accordance with a determination that the entry includes an identifier of the pending data transaction in the plurality of FIFO transaction queues, updating the pending data transaction for the respective data transaction record to include dependency data.

11. A non-transitory computer-readable storage medium storing one or more programs for execution by one or more processors of a machine, the one or more programs comprising instructions that, when executed by the one or more processors, cause the machine to perform operations comprising:

reading each of a plurality of data transaction records from a single transaction log in a sequence in which the plurality of data transaction records were added to the transaction log, each of the plurality of data transaction records indicating a change to be applied to a section of a data set;

for each respective data transaction record read from the transaction log in the sequence in which the plurality of data transaction records were added to the transaction log:

selecting, based on metadata associated with the respective data transaction record, a single transaction queue from a plurality of first in, first out (FIFO) transaction queues for the respective data transaction record; and adding a pending data transaction for the respective data transaction record into the selected transaction queue; and concurrently processing the plurality of FIFO transaction queues, the processing comprising, for each associated transaction queue of the plurality of FIFO transaction queues:

determining whether a next pending data transaction of the associated transaction queue is dependent on any other pending data transaction in the plurality of FIFO transaction queues based on the section of the data set indicated in the next pending data transaction;

in accordance with a determination that the next pending data transaction is not dependent on any other pending data transaction in the plurality of FIFO transaction queues:

applying the next pending data transaction to the data set; and removing the next pending data transaction from the associated transaction queue; and in accordance with a determination that the next pending data transaction is dependent on another pending data transaction in the plurality of FIFO transaction queues:

waiting until the other pending data transaction has been applied to the data set; and after waiting until the other pending data transaction has been applied:

applying the next pending data transaction to the data set; and removing the next pending data transaction from the associated transaction queue.

12. The non-transitory computer-readable storage medium of claim 11, wherein the plurality of data transaction records represent data changes made to the data set over a period of time.

13. The non-transitory computer-readable storage medium of claim 11, wherein, in each of the plurality of data transaction records, the section of the data set is indicated by a target data address.

* * * * *